Patented Mar. 15, 1938

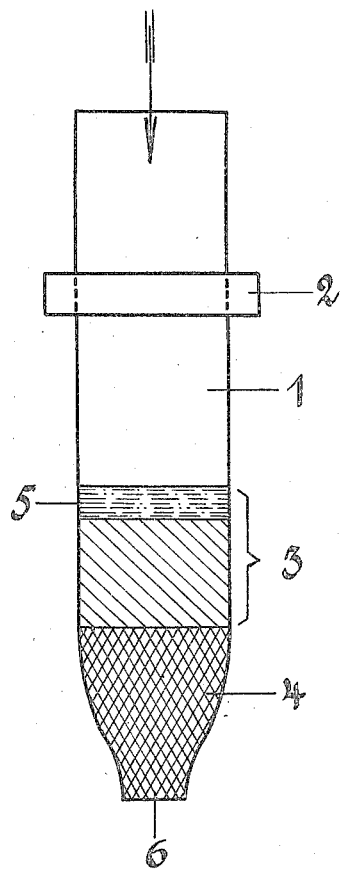

2,111,301

UNITED STATES PATENT OFFICE 2,111,301

METHOD OF DETECTING THE PRESENCE OF CARBON MONOXIDE

Gustav-Adolf Schröter, Dessau, Germany, assignor to Otto Heinrich Dräger, Lubeck, Germany Application December 23, 1935, Serial No. 55,902
In Germany December 24, 1934

4 Claims. (Cl. 23—232)

This invention relates to a method of rendering detectable or of verifying the presence of small quantities of carbon monoxide in air, gas or generally in a gaseous medium.

One object of the invention is to provide such a method adapted to be used in all work shops or other places in which carbon monoxide is used or may be present, e. g. in mines, smelting works, or gas works. For all such places the method of the invention is of great importance.

It has already often been tried to render carbon monoxide detectable if present in very small quantities. One known proposal makes use of the fact that palladious chloride is adapted to be reduced by carbon monoxide to palladium giving a color change from yellow to grey or black. This palladious chloride was hitherto used as an impregnation of filter paper or as an addition to a solution of copper chloride in which the gas to be investigated had previously been enriched. This latter method is difficult to handle and cannot practically be used e. g. in mines, because shaking of long duration is necessary for solving carbon monoxide in a copper chloride solution. Moreover, adsorption solutions in general are difficult to handle. As to the method of using test paper its sensibility is insufficient and not easily definable.

Another object of the invention, therefore, is the removal of these disadvantages of the known methods. This is done by using a colorless gas-adsorbing gel which has been impregnated with palladious chloride and which has been suitably prepared subsequent to the impregnation e. g. by activating it. The invention comprises the following steps: impregnating a colorless gas-adsorbing gel with palladious chloride, then activating said palladious chloride upon said gel by heating the impregnated gel for a long time in vacuo, rendering said impregnated gel dry and keeping it in a dry state, thereafter sucking the gaseous mixture through said dry gel, whereby the carbon oxide is enriched on the gel, and then moistening the gel with water in order to develop the gel and to produce the changes in color. Preferably the colorless gas adsorbing gel used is silica gel which has been previously activated. Further the activation of the palladious chloride upon said gel is preferably effected by heating the gel and the palladium chloride up to 140° C. in vacuo.

It is known that the silica gel is adapted to adsorb gas, and it is further known to use this feature for gas-analytic tests.

Hitherto it was, however, not possible to make use of this fact with respect to carbon monoxide by using palladious chloride. The reason was that on account of the small molecular weight of carbon monoxide this gas is not sufficiently adsorbed by silica gel—even if this gel has been previously activated. If one would use activated silica gel and would bring the gaseous medium to be tested into contact with this gel, there would, therefore, be no enrichment of carbon monoxide on the gel. If one would impregnate the gel after having been in contact with the gaseous medium to be tested and with the carbon monoxide therein contained with a solution of palladious chloride, no carbon monoxide would be indicated on the gel.

On the other hand it would also not be possible to use palladius chloride alone for detecting carbon monoxide, because the capacity of palladious chloride for carbon monoxide is rather small. Therefore, in the art of gas-analyzing solutions of copper chloride are used for enriching carbon monoxide in which solutions palladium solutions are inserted drop by drop for indicating the carbon monoxide.

The method of the invention may be carried through in such a manner that the colorless gas adsorbing gel, preferably silica gel, is impregnated before use with palladious chloride and that then the gaseous medium to be tested is sucked through the gel. If the method is executed in this manner, one obtains only at relatively high carbon monoxide concentrations a grey-coloring of the originally light yellow-colored impregnated gel.

Therefore, it is the proposal of the invention to activate the palladious chloride together with the gel thus changing them as a whole into a useful indicating agent.

The activation may be done by heating the palladious chloride and the silica gel a long time, preferably for three hours and at a temperature of 140° C. in vacuo. When doing this the palladious chloride is partly reduced, which fact may be recognized from the outside by the fact that the color is changed from light-yellow into brown.

The gel thus treated does not show any change when brought into contact with air containing carbon oxide. For indicating the presence of carbon oxide in the air it is necessary to moisten the gel mixture after having been enriched with carbon monoxide, after which step the color of gel changes into grey or black. The sensibility is so that it is practically possible to detect carbon monoxide down to a concentration of 0.04% CO in air.

For carrying through the method of the invention preferably devices are used as described in a more general manner in the co-pending application Serial Number 734,417 of Franz Hollmann (which has issued as Patent No. 2,069,035) or in a more specific manner in the co-pending application Serial Number 30,372 of G. K. E. H. Stampe which has issued as Patent 2,097,650.

An indicating or testing device which might be used in connection with the method of the invention is shown by way of example in a diagrammatic manner in the drawing.

The device is a tube 1 of suitable material, e. g., glass, which is transparent either as a whole or in part. The tube is shown in a side view on the drawing. A packing ring 2 of elastic material surrounds the upper portion of said tube. This ring holds the tube tightly in the mouthpiece of a pump such as referred to in said co-pending application Serial Number 734,417 (which has issued as Patent No. 2,069,035) (but not shown here). The silica gel layer 3 rests within the tube on a supporting layer 4 which is preferably elastic and is contained in the end 6 of smaller diameter of the tube.

By actuating the pump, which holds the tube in its mouthpiece, the gaseous medium is sucked through the tube in the direction of the arrow in a manner described in said above mentioned co-pending applications. If carbon monoxide is present and has been enriched sufficiently upon the gel, the addition of water will cause the gel to change its color to a grey or black. This color change is most marked at the annular layer 5.

Both layers 3 and 4 and the ring-shaped layer 5 have been indicated only diagrammatically in the drawing.

The gel must be entirely dry when used in connection with the method of the invention because only then the carbon monoxide is enriched on the gel. It is necessary, therefore, to take care that the tube is air-tightly closed while storing the tube.

The use of such a testing tube on places suspected of containing carbon monoxide is rather simple. The testing tubes may be prepared in advance on any suitable place in the manner described and may then be used by bringing the suspected air of such place into contact with their indicating layers as described.

I claim:—

1. A method of rendering detectable small quantities of carbon monoxide in air or other gases, comprising drawing the gaseous mixture through a dry activated body comprising a colorless gas adsorbing gel impregnated with palladious chloride and which has been activated by heating in vacuum to dry said impregnated gel, and then moistening the body with water.

2. A method of rendering detectable small quantities of carbon monoxide in air or other gases, comprising drawing the gaseous mixture through a dry activated body comprising activated silica gel impregnated with palladious chloride and which has been activated by heating in vacuum to dry said impregnated gel, and then moistening the body with water.

3. A method of rendering detectable small quantities of carbon monoxide in air or other gases, comprising drawing the gaseous mixture through a dry activated body comprising a colorless gas adsorbing gel impregnated with palladious chloride and which has been activated by heating to 140° C. in vacuum to dry said impregnated gel, and then moistening the body with water.

4. In a device for detecting carbon monoxide in air or other gases, a tube of transparent material containing a layer of a dry colorless gas-adsorbing gel impregnated with palladious chloride and activated by heating the impregnated gel in vacuum.

GUSTAV-ADOLF SCHRÖTER.